United States Patent Office 3,313,294
Patented Apr. 11, 1967

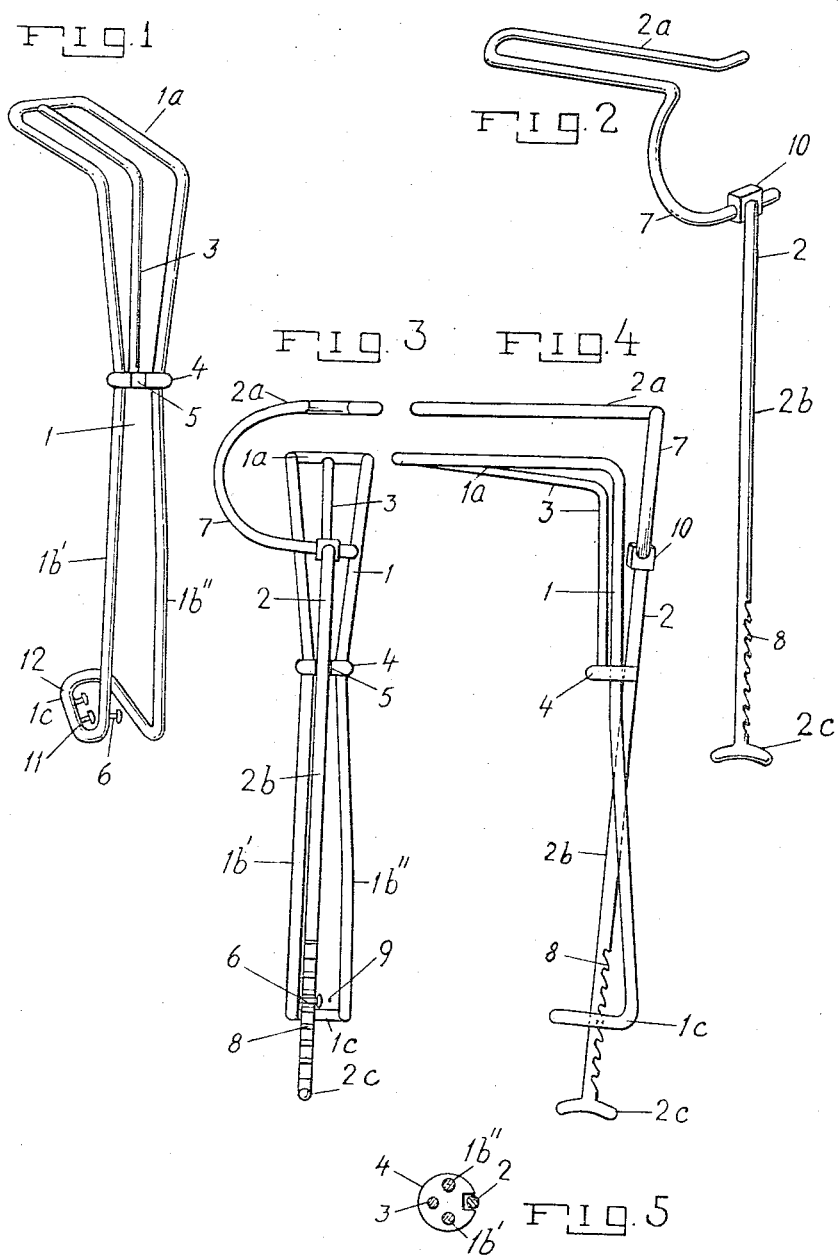

3,313,294
INSTRUMENTS FOR OPEN-HOLDING OF CAVITY
OPENINGS IN THE HUMAN BODY
Göran Olof Uddenberg, Rangeltorpsgatan 49,
Goteborg, Sweden
Filed June 4, 1964, Ser. No. 372,575
Claims priority, application Sweden, Sept. 6, 1963,
9,762/63
4 Claims. (Cl. 128—20)

This invention relates to an improved instrument for the holding open of cavities, wounds, cuts or the like in the human body for inspections and operations.

It is an object of this invention to provide an instrument which is easy to handle and apply into an opening in the human body in order to retain such opening in an open condition thus permitting an inspection of parts behind the same.

It is another object of this invention to provide an instrument for a self-retaining of the walls of an opening in the human body with a minimum of patient reaction or discomfort.

It is a further object of this invention to provide an instrument to hold an opening in the human body open and which instrument can be assembled and disassembled by a simple twist of the handgrips thereof.

It is still a further object of this invention to provide an instrument suitable for use as a self-retaining vagina speculum.

With these and other objects in view the invention essentially consists of an instrument which has the shape of a pair of tongs, each shank of said tongs being a separate part to be assembled with the other shank by a simple inserting of the one shank into the other without any use of tools, the one shank comprising the one handgrip having a bearing for the other shank comprising the other handgrip of the tongs, the latter shank being tiltable and axially displaceable in the bearing and being able to be maintained in different displacements by means of a rack mechanism consisting of a number of teeth at the one shank and a rack at the other.

In the accompanying drawing:

FIGURES 1 and 2 are side views of each shank of the tongs, respectively,

FIGURES 3 and 4 are a front view and a side view, respectively, of the assembled tongs, and FIGURE 5 is a view in cross section of the assembled shanks.

The instrument constituted by a pair of tongs consists of two separate shanks 1, 2 preferably wires of stainless steel or of other material. The shank 1 is a holding shank and shank 2 a displaceable shank 2. The shanks 1 and 2 are each provided at one end thereof (here indicated as the "upper" end) with a jaw blade 1a and 2a respectively directed laterally perpendicular relative to the length of the shank. Each blade is constituted by two spaced wire parts at the side of each other. The holder shank 1 consists of a wire which is bent so that two wire parts extend in spaced relationship to each other to form a lengthened handgrip 1b′, 1b″. The jaw blade 1a is in the shape of a bow at the upper end of the shank 1 and a short bow 1c is provided at the lower end. The bow 1c extends in the same direction as the jaw blade 1a for a use to be later described. The two wire parts 1b′, 1b″ are held together at the middle thereof by a circular bearing plate 4. A further steel wire part 3 is attached to be positioned between the two wire parts and extends from the circular plate to the upper end of the jaw blade 1a to reinforce the action of the blade. At the opposite side of the wire part 3, the circular plate 4 is provided with an axial groove 5 having dimensions corresponding to the thickness of the shank 2 which is to be positioned therein.

The displaceable shank 2 consists of a straight part 2b and the upper end thereof is provided with the laterally directed jaw blade 2a defined by a broad bow. Between the shank 2 and the jaw 2a the shank is also provided with a second lateral bow 7 in a plane perpendicular to the plane of the jaw and which serves as an additional handgrip for adjusting the jaw blade during the use of the same. The other or lower end of the shank 2 is provided with a foot in the shape of a short laterally extending arcuate piece 2c which functions as a finger support during adjustment. Further, the shank 2 adjacent the foot 2c is provided with a toothed rack 8 which extends along the rear of the shank relative to the jaw 2a. The bow 7, which is integral with the jaw blade 2a, has its opposite or free end disposed in a bearing 10 for the shank 2 and can be turned and axially displaced for the adjustment of the jaw blade.

In order to secure the adjustment positions of the two shanks in reference to each other the rack 8 is adapted to coact with a tooth or projection 6 adjacent the lower end of the shank 1. The tooth 6 is attached to the shank part 1b′ between such part and the shank part 1b″ and is directed towards the latter as seen in FIG. 3. When the tooth 6 is lodged into a space between adjacent teeth of the rack 8, the jaw blades 1a and 2a are maintained in the corresponding positions relative to each other. There are also preferably two additional teeth 11, 12 on the bow 1c at the inner side of the shank part 1b′ and such teeth are directed towards the shank part 1b″. By the alternative use of these teeth together with the rack 8 a difference in the angle between the jaw blades 1a, 2a can be obtained.

During use of the instrument, the two shanks are assembled without the use of any tools in that the shank 2 is inserted into the groove 5 in the bearing plate 4. To effect this action the straight part 2b is inserted between the two parts 1b′ and 1b″ to the right in FIG. 3 in the space between the tooth 6 and the right hand part 1b″. The shank 2 is then moved to the left in FIG. 3 whereby the tooth 6 and rack 8 coact after the jaw blades have been adjusted. If, for instance, the instrument is to be used as a speculum for observations in the vagina, the jaw blades 1a and 2a positioned close together, are inserted into the front mouth portions, after which the jaw blades are separated by the axial displacement of the shank 2 to a position permitting an observation of the vagina. This latter position of the cagina is automatically maintained since the tooth 6 is in operative relationship with the rack 8, with an outer pressure acting upon the jaw blades from the walls of the opening assisting in holding the rack mechanism in position. The wire-shaped material used for the above mentioned instrument facilitates the observations and does not detract from these observations.

If the opening of the vagina is to be such that it is widened outwardly, the teeth 6, 11, 12 may alternatively be used in coaction with the rack 8 to alter the angle between the jaw blades 1a and 2a. All of the teeth may be provided with heads or the like to secure the straight part 2b of the shank 2 in an inserted position underlying the head of the tooth.

The disassembling of the shanks is effected in a similar simple fashion. The rack 8 of the shank 2 is removed rearwardly from the coating tooth and then moved to the right in FIG. 3 through space 9 between the lead of the tooth and the part 1b″ and lifted at the same time from the groove 5. Hence, the shanks are then free for cleaning and sterilizing.

This invention is not to be confined to any strict conformity to the showings in the drawings but changes or modifications may be made therein so long as such changes or modifications mark no material departure from the spirit and scope of the appended claims.

I claim:
1. An instrument for holding open cavities, wounds and cuts in a human body, comprising a pair of wire shanks with one shank being a holder shank and the other a shank displaceable relative to the holder shank, each of said shanks having a jaw blade disposed substantially at right angles to the length of the shanks, a bearing plate on said holder shank adapted to receive said displaceable shank for tilting and sliding movements in said bearing plate, and a rack assembly including teeth on one of said shanks and a toothed rack on the other shank with said teeth and toothed rack coacting to maintain said shanks in different tilting positions, said holder shank including two wire parts extending in spaced relationship thereto and providing at one end a bow portion constituting the jaw blade, said bearing plate being secured to said wire parts adjacent the mid point of the length of said holder shank, said bearing plate having an axial groove open at the edge of said bearing plate between said two wire parts and said other shank including a straight wire part slidable in said groove with said rack assembly and bearing plate detachably connecting said two shanks in each mutual operating position.

2. The instrument as claimed in claim 1 in which the wire parts of said holder shank at the end remote from the jaw blade includes an arcuate foot portion extending in the same direction as the jaw blade, said teeth being provided on one of the wire parts of said arcuate foot portion and extending in the direction of the other wire part, each of said teeth having a head, and said toothed rack being located on the straight part of said other shank for alternate cooperation with the teeth of said holder shank.

3. The instrument as claimed in claim 1 in which the jaw blade on said displaceable shank is formed in one piece having a bow portion with said bow portion being connected to and directed laterally of the straight part of said displaceable shank.

4. The instrument as claimed in claim 1 in which the straight part of said displaceable shank is provided with a cross piece at the end remote from the jaw blade constituting a finger grip for displacing said shank relative to said holder shank.

References Cited by the Examiner

UNITED STATES PATENTS

| | | | |
|---|---|---|---|
| 361,087 | 4/1887 | Schenck | 128—17 |
| 779,885 | 1/1905 | Spangler | 128—3 |
| 997,823 | 7/1911 | Humphreys | 128—20 |
| 1,018,868 | 2/1912 | Breneman | 128—17 |
| 2,809,628 | 10/1957 | Jonas | 128—17 |

RICHARD A. GAUDET, *Primary Examiner.*

DALTON L. TRULUCK, *Examiner.*